United States Patent
Ogo et al.

(10) Patent No.: US 7,418,542 B2
(45) Date of Patent: Aug. 26, 2008

(54) REWRITABLE, NONVOLATILE MEMORY, ELECTRONIC DEVICE, METHOD OF REWRITING REWRITABLE, NONVOLATILE MEMORY, AND STORAGE MEDIUM HAVING STORED THEREON REWRITE PROGRAM

(75) Inventors: Atsushi Ogo, Yamatokoriyama (JP); Shuhji Fujii, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 254 days.

(21) Appl. No.: 11/246,788

(22) Filed: Oct. 11, 2005

(65) Prior Publication Data

US 2006/0090158 A1   Apr. 27, 2006

(30) Foreign Application Priority Data

Oct. 14, 2004   (JP)   ............................. 2004-300785

(51) Int. Cl.
*G06F 12/00* (2006.01)
*G06F 9/44* (2006.01)

(52) U.S. Cl. .................. 711/103; 711/165; 717/168

(58) Field of Classification Search .................. 711/103
See application file for complete search history.

(56) References Cited

U.S. PATENT DOCUMENTS

| | | | |
|---|---|---|---|
| 6,073,207 A * | 6/2000 | Ideta | 711/103 |
| 6,233,105 B1 * | 5/2001 | Chen et al. | 360/48 |
| 6,311,322 B1 * | 10/2001 | Ikeda et al. | 717/168 |
| 2002/0029314 A1 * | 3/2002 | Minamizawa et al. | 711/103 |
| 2002/0046344 A1 * | 4/2002 | Naito | 713/189 |
| 2005/0138645 A1 * | 6/2005 | Lu | 719/321 |
| 2005/0246701 A1 * | 11/2005 | Kanapathipillai et al. | 717/168 |

FOREIGN PATENT DOCUMENTS

| | | |
|---|---|---|
| JP | 11-338690 | 12/1999 |
| JP | 2003-288213 | 10/2003 |

* cited by examiner

*Primary Examiner*—Hyung Sough
*Assistant Examiner*—Kaushikkumar Patel
(74) *Attorney, Agent, or Firm*—Nixon & Vanderhye, PC

(57) ABSTRACT

A rewritable, nonvolatile memory includes a first region having stored therein a processing program which allows an electronic device to perform a process, and having a first specific portion which is accessed first upon boot-up by the electronic device; and a second region having stored therein a boot program and a rewrite program. Upon erasing storage contents of the first region, the storage contents of the first region are erased by the rewrite program such that a storage content of the first specific portion is erased last. Upon writing storage contents into the first region, new storage contents are written into the first region by the rewrite program such that a storage content of the first specific portion is written first.

18 Claims, 7 Drawing Sheets

REWRITABLE, NONVOLATILE MEMORY, ELECTRONIC DEVICE, METHOD OF REWRITING REWRITABLE, NONVOLATILE MEMORY, AND STORAGE MEDIUM HAVING STORED THEREON REWRITE PROGRAM

CROSS REFERENCE TO RELATED APPLICATIONS

This Nonprovisional application claims priority under 35 U.S.C.§119(a) on Patent Application No. 2004-300785 filed in Japan on Oct. 14, 2004, the entire contents of which are hereby incorporated by reference.

BACKGROUND OF THE INVENTION

1. Field of the Invention

The present invention relates to a rewritable, nonvolatile memory, such as a flash memory, that stores an executable program which allows an electronic device to perform a process, and a rewrite program used to rewrite the executable program, an electronic device, a method of rewriting the rewritable, nonvolatile memory, and a storage medium having stored thereon a rewrite program.

2. Description of the Background Art

An electronic device, such as a personal computer (PC), an image forming apparatus which forms an image based on digital image data, or any other household electrical appliance, has an processing unit that executes a program, and ROM that stores the program to be executed by the processing unit. For ROM included in the electronic device, a flash memory which is a rewritable, nonvolatile memory is widely used. The electronic device performs a process by reading a program stored in a flash memory and executing the program at the processing unit.

To correct malfunctions, improve functions, or the like, the need may arise for an electronic device including a flash memory to rewrite the storage contents of the flash memory. The configurations of an electronic device that allow for rewriting of a flash memory include one in which a means of rewriting the storage contents of the flash memory is provided to a portion other than the flash memory, and one in which the flash memory has stored therein a rewrite program for itself. Japanese Patent Application Laid-Open No. 11-338690 discloses a flash memory having a first region where a program is stored, and a second region, which is different from the first region, where a program used to rewrite the program stored in the flash memory is stored.

When the electronic device employs the configuration in which a means of rewriting the storage contents of the flash memory is provided to a portion other than the flash memory, the configuration of the electronic device becomes complicated, causing an increase in costs. On the other hand, when the electronic device employs the configuration in which the flash memory has stored therein a rewrite program for itself, if an error occurs, where the electronic device is stopped while the storage contents of the flash memory are being rewritten, there is a possibility that the electronic device may become unable to start up due to the program stored in the flash memory being incomplete.

In the flash memory disclosed in Japanese Patent Application Laid-Open No. 11-338690, since the second region is accessed first upon boot-up by the electronic device and has stored therein a boot program used by the electronic device to perform a boot, the electronic device is always able to start up. However, in a flash memory having a program to be rewritten which is stored in a region including a portion accessed first upon boot-up by the electronic device, there is a possibility that the electronic device may become unable to start up after rewriting is done.

SUMMARY OF THE INVENTION

The present invention is made in view of the foregoing problems.

A first object of the present invention is to provide a rewritable, nonvolatile memory which enables an electronic device to always start up even if a program to be rewritten is stored in a region including a portion accessed first upon boot-up by the electronic device, an electronic device having the rewritable, nonvolatile memory, a method of rewriting the rewritable, nonvolatile memory, and a storage medium having stored thereon a rewrite program.

A second object of the present invention is to provide a rewritable, nonvolatile memory with which whether rewriting of a program is done properly can be easily determined, an electronic device, a method of rewriting the rewritable, nonvolatile memory, and a storage medium having stored thereon a rewrite program.

A third object of the present invention is to provide a rewritable, nonvolatile memory which enables an electronic device to perform an operation appropriate for the status of a program, such as rewrite failure, an electronic device, a method of rewriting the rewritable, nonvolatile memory, and a storage medium having stored thereon a rewrite program.

A fourth object of the present invention is to provide a rewritable, nonvolatile memory capable of preventing unauthorized rewriting of a program, an electronic device, a method of rewriting the rewritable, nonvolatile memory, and a storage medium having stored thereon a rewrite program.

A rewritable, nonvolatile memory of the present invention comprises: a first region that stores a processing program which allows an electronic device to perform a process; a second region that stores a boot program and a rewrite program, the boot program allowing the electronic device to perform a boot and the rewrite program allowing the electronic device to rewrite the processing program; and a first specific portion provided in the first region and having stored therein information necessary for the electronic device to access a portion of the second region where the boot program is stored, the first specific portion being accessed first upon boot-up by the electronic device, and the rewrite program comprises the steps of allowing the electronic device to erase storage contents of the first region such that a storage content of the first specific portion is erased last; and after the storage contents of the first region are erased by the erasing step, allowing the electronic device to write storage contents including a new processing program into the first region such that a storage content of the first specific portion is written first.

In the rewritable, nonvolatile memory of the present invention, the first region includes a second specific portion whose storage content is erased first upon erasing the storage contents of the first region and is written last upon writing the storage contents including a new processing program into the first region, the erasing and the writing being performed by the electronic device according to the rewrite program, and the second specific portion has stored therein information indicating whether the storage contents are completely written into the first region.

In the rewritable, nonvolatile memory of the present invention, the boot program comprises the steps of: allowing the electronic device to check a content of the information indicating whether the storage contents are completely written into the first region, the information being stored in the second specific portion; and allowing the electronic device to determine a subsequent process to be performed, according to the checked content of the information.

In the rewritable, nonvolatile memory of the present invention, the boot program comprises the steps of allowing the electronic device to start the processing program stored in the first region; allowing the electronic device to check, prior to the start of the processing program, content of the information indicating whether the storage contents are completely written into the first region, the information being stored in the second specific portion; and allowing the electronic device to determine a subsequent process to be performed, according to the checked content of the information.

In the rewritable, nonvolatile memory of the present invention, the rewrite program further comprises the step of: allowing the electronic device to rewrite the boot program stored in the second region.

In the rewritable, nonvolatile memory of the present invention, the rewrite program further comprises the steps of allowing the electronic device to request, prior to the rewriting of the program, for reception of predetermined identification information; and allowing, if the predetermined identification information is received, the electronic device to start rewriting the program.

A rewritable, nonvolatile memory of the present invention comprises: a first region that stores a processing program which allows an electronic device to perform a process; a second region that stores a boot program and a rewrite program, the boot program allowing the electronic device to perform a boot and the rewrite program allowing the electronic device to rewrite the processing program; and a first specific portion provided in a portion of the first region which includes a portion containing a starting address, the first specific portion having stored therein information necessary for the electronic device to access a portion of the second region where the boot program is stored, the first specific portion being accessed first upon boot-up by the electronic device, and the rewrite program comprises the steps of allowing the electronic device to sequentially erase storage contents of the first region from a portion of the first region that contains an ending address toward the portion containing the starting address; and after the storage contents of the first region are erased by the erasing step, allowing the electronic device to sequentially write storage contents including a new processing program into the first region from the portion containing the starting address toward the portion containing the ending address.

In the present invention, a flash memory (rewritable, nonvolatile memory) included in an electronic device has a first region having stored therein a processing program which allows the electronic device to perform a process, and having a first specific portion which is accessed first upon boot-up by the electronic device; and a second region having stored therein a boot program and a rewrite program. The first specific portion has stored therein information necessary for the electronic device to access a portion of the flash memory where the boot program is stored. The electronic device accesses the first specific portion first upon boot-up, accesses the portion where the boot program is stored according to the information stored in the first specific portion, and performs a process according to the boot program. Upon rewriting storage contents of the first region, by the rewrite program, the storage contents of the first region are erased such that a storage content of the first specific portion is erased last, and new storage contents are written into the first region such that a storage content of the first specific portion is written first.

In the present invention, the first region of the flash memory includes a second specific portion whose storage content is erased first and written last upon rewriting. The second specific portion has stored therein information indicating whether the storage contents are completely written into the first region.

In the present invention, the first specific portion which is accessed first upon boot-up by the electronic device is a starting portion of the flash memory. Upon rewriting the first region, by the rewrite program, the storage contents are erased from the end of the first region toward the start of the first region, and new storage contents are written from the start of the first region toward the end of the first region.

In the present invention, the boot program checks information which is contained in the second specific portion and which indicates whether the storage contents of the first region are completely written, and then determines a subsequent process, such as a stop of the electronic device, according to the checked content. In the present invention, the boot program checks, prior to the start of the program upon boot-up by the electronic device, information which is contained in the second specific portion and which indicates whether the storage contents of the first region are completely written, and then determines a subsequent process, such as a stop of the electronic device, according to the checked content. In the present invention, by the rewrite program, the boot program can also be rewritten.

Further, in the present invention, upon rewriting the flash memory, predetermined identification information is received for user authentication.

In the present invention, the storage contents of a first region of a flash memory (rewritable, nonvolatile memory) are rewritten such that a storage content of a first specific portion which is accessed first upon boot-up by the electronic device is erased last and written first. By doing so, even after an error occurs, where the electronic device is stopped while the flash memory is being rewritten, the storage content of the first specific portion still remains. Since the first specific portion has stored therein information necessary to access a portion of a second region of the flash memory where a boot program is stored, even if rewriting of the flash memory is failed, the electronic device can always start up.

In the present invention, in the second specific portion whose storage content is erased first and written last when the first region of the flash memory having stored therein a program is rewritten, information indicating whether the storage contents are completely written into the first region is stored. By this, if an error occurs, where the electronic device is stopped while the flash memory is being rewritten, since the second specific portion has no information stored therein, by checking the storage content of the second specific portion, whether the rewriting of the program is done properly can be easily determined.

In the present invention, during a boot process performed by the electronic device, information indicating whether the storage contents are completely written into the first region having stored therein a program is checked. By doing so, whether the rewriting of the program is done properly can be determined, and an operation appropriate for the status of the program can be performed.

In the present invention, by checking, before the program stored in the first region of the flash memory starts, information indicating whether the storage content are completely written into the first region, even if there is an error in the program, without the electronic device being abnormally stopped, an operation appropriate for the status of the program, such as re-rewriting of the program, can be performed.

In the present invention, not only a program stored in the first region of the flash memory but also a boot program can be rewritten, and thus updating of the boot program is facilitated.

Furthermore, in the present invention, an input of predetermined identification information is required before the flash memory is rewritten, which in turn prevents unauthorized rewriting by users having no authority to rewrite the flash memory.

The above and further objects and features of the invention will more fully be apparent from the following detailed description with accompanying drawings.

DESCRIPTION OF THE PREFERRED EMBODIMENTS

Figure 1:
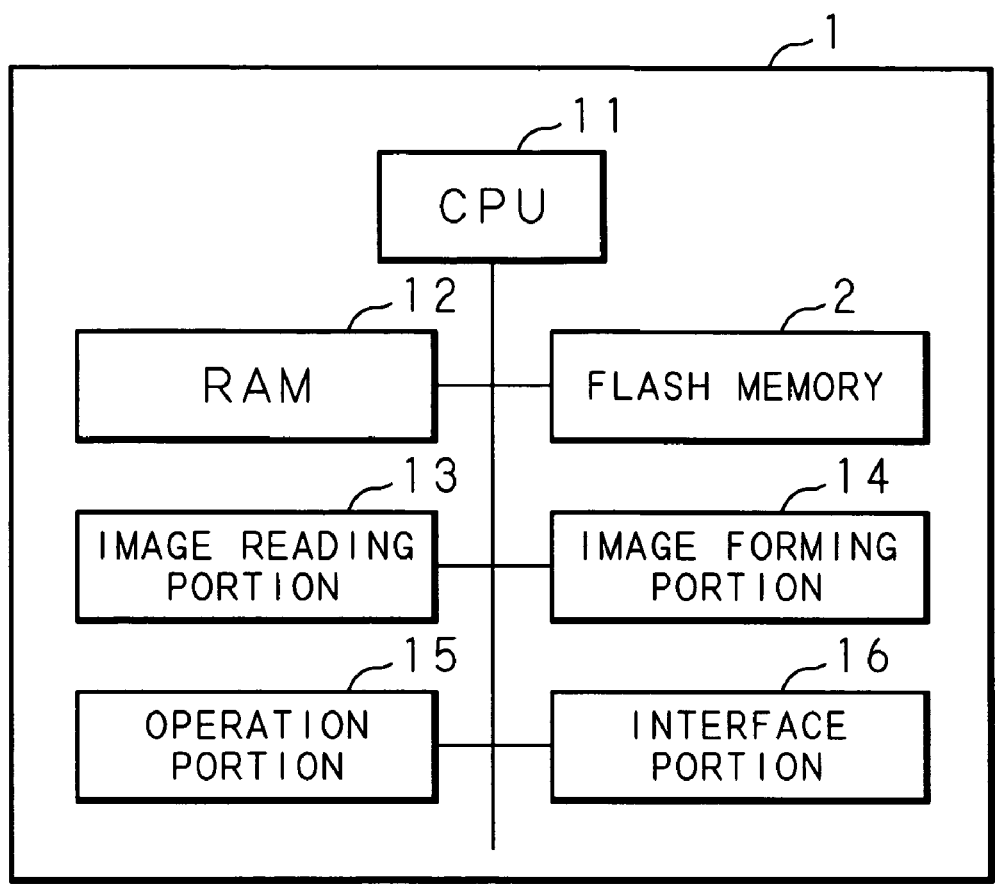
FIG. 1 is a functional block diagram showing an exemplary internal configuration of an electronic device of the present invention.

FIG. 1 is a functional block diagram showing an exemplary internal configuration of an electronic device of the present invention. FIG. 1 shows an example where the electronic device of the present invention is an image forming apparatus 1. The image forming apparatus 1 includes a CPU 11 that performs calculations; RAM 12 that stores temporary information generated as a result of calculations; and a flash memory 2 which is a rewritable, nonvolatile memory of the present invention. The flash memory 2 has stored therein a program which allows the CPU 11 to perform a process that should be done by the image forming apparatus 1. The CPU 11 loads, where necessary, the program stored in the flash memory 2 into the RAM 12, and performs a necessary process on the image forming apparatus 1 based on the loaded program.

To the CPU 11 are connected an image reading portion 13 that generates image data by reading a document image recorded on the document; and an image forming portion 14 that forms an image based on the image data, and allows the image to be recorded on a recording paper. The CPU 11 performs a process of allowing the image reading portion 13 to generate image data, and then allowing the image forming portion 14 to form an image based on the generated image data.

In addition, to the CPU 11 is connected an operation portion 15 that receives an operation from a user. The operation portion 15 is composed of a display means, such as a liquid crystal panel, for displaying necessary information for operation; and an input means, such as a touch panel or a numeric keypad, from which information such as a control instruction is inputted by a user operation. The operation portion 15 is configured such that the input means is able to receive an instruction to rewrite the flash memory 2.

Further, to the CPU 11 is connected an interface portion 16 to which an external device or a communication network can be connected. The interface portion 16 is configured to receive, upon rewriting the flash memory 2, data of new storage contents including a new program for the flash memory 2, from a connected external device or communication network. The CPU 11 performs a process of writing the data of new storage contents received by the interface portion 16, into the flash memory 2.

Figure 2:
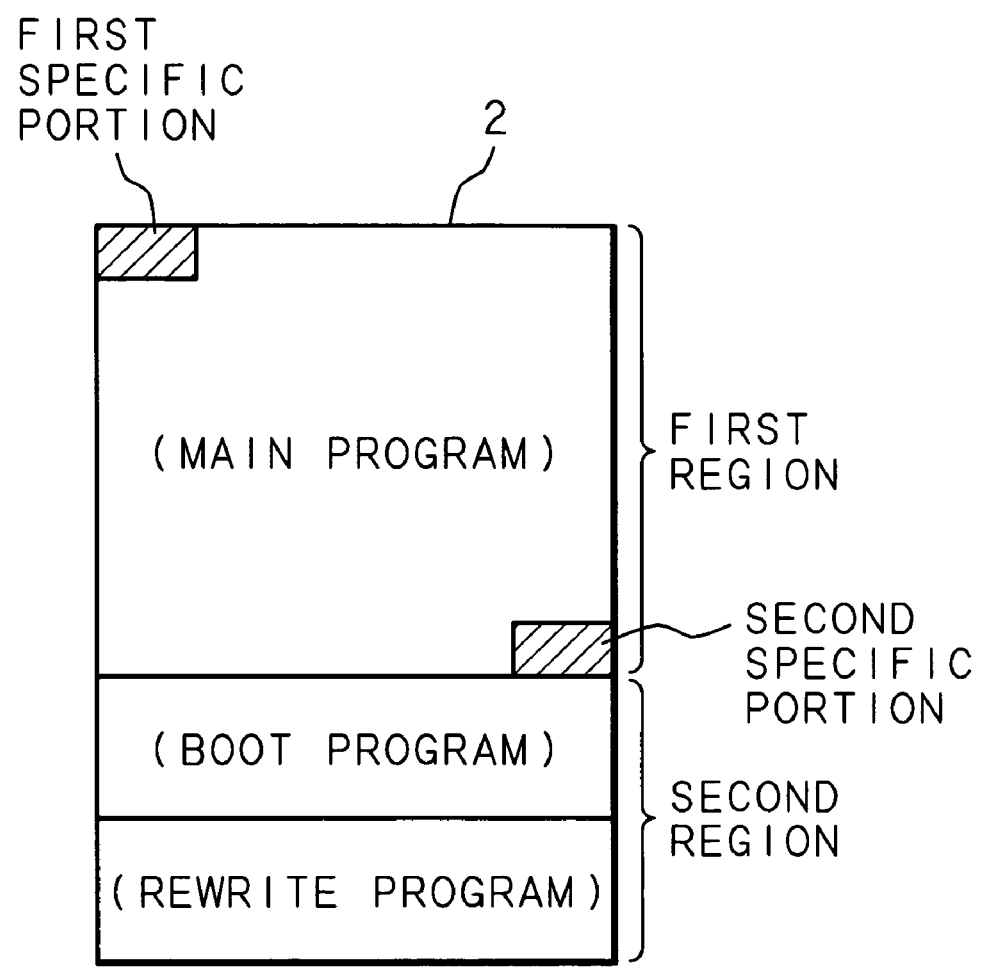
FIG. 2 is a schematic diagram conceptually showing the internal configuration and storage contents of a flash memory.

FIG. 2 is a schematic diagram conceptually showing the internal configuration and storage contents of the flash memory 2. The flash memory 2 has a first region having stored therein a main program (processing program) which allows the CPU 11 to perform a process which represents the main function of the image forming apparatus 1; and a second region having stored therein a boot program which allows the image forming apparatus 1 to perform a boot, and a rewrite program which allows the CPU 11 to rewrite the flash memory 2. The first region is a contiguous region including a portion containing a starting address of the flash memory 2, and has rewritable storage contents. In a normal state, the CPU 11 performs a process according to the main program stored in the first region of the flash memory 2.

The second region is a region different from the first region of the flash memory 2. The second region has a boot program stored in the first half portion thereof which includes a portion containing a starting address of the second region, and a rewrite program stored in the second half portion thereof. Rewriting is not permitted in at least an area of the second region where the rewrite program is stored.

When the image forming apparatus 1 boots up, the CPU 11 first accesses a first specific portion including the portion containing the starting address of the flash memory 2. The first specific portion has stored therein information indicating a portion of the second region where the boot program is stored. Normally, the boot program is stored starting at the portion of the second region that contains the starting address, and thus, in the first specific portion information indicating the starting address of the second region is stored. Upon boot-up, the CPU 11 first accesses the first specific portion of the first region of the flash memory 2. Then, the CPU 11 accesses the portion of the second region that contains the starting address, which is indicated by the information stored in the first specific portion, and then allows the image forming apparatus 1 to boot up according to the boot program stored in the accessed second region.

The rewrite program stored in the second region of the flash memory 2 includes a program which allows the CPU 11 to erase, upon rewriting the flash memory 2, the storage contents of the first region from a portion of the first region that contains an ending address toward the portion of the first region that contains the starting address. In addition, the rewrite program includes a program which allows the CPU 11 to write, after the storage contents of the first region are erased, new storage contents into the first region from the portion containing the starting address toward the portion containing the ending address. Hence, upon rewriting the flash memory 2, the information stored in the first specific portion is erased last and written first.

In a second specific portion which includes a portion containing the ending address of the first region, upon rewriting the flash memory 2, a storage content of the second specific portion is erased first and written last. The second specific portion has stored therein information indicating whether the storage contents are completely written into the first region. Normally, the second specific portion has stored therein information indicating that the storage contents are completely written into the first region. If the second specific portion has no storage content, the CPU 11 determines that the storage contents are not completely written into the first region.

The rewrite program also includes a program which allows the CPU 11 to rewrite not only the storage contents of the first region but also the boot program stored in the second region. Upon rewriting the boot program, the CPU 11 performs a process of erasing the boot program stored in the second region, and then writing a new boot program into the second region, according to the rewrite program stored in the second region of the flash memory 2. The rewrite program further includes a program which requests, upon rewriting the flash memory 2, for identification information, such as a predetermined password, for user authentication.

Figure 3A:
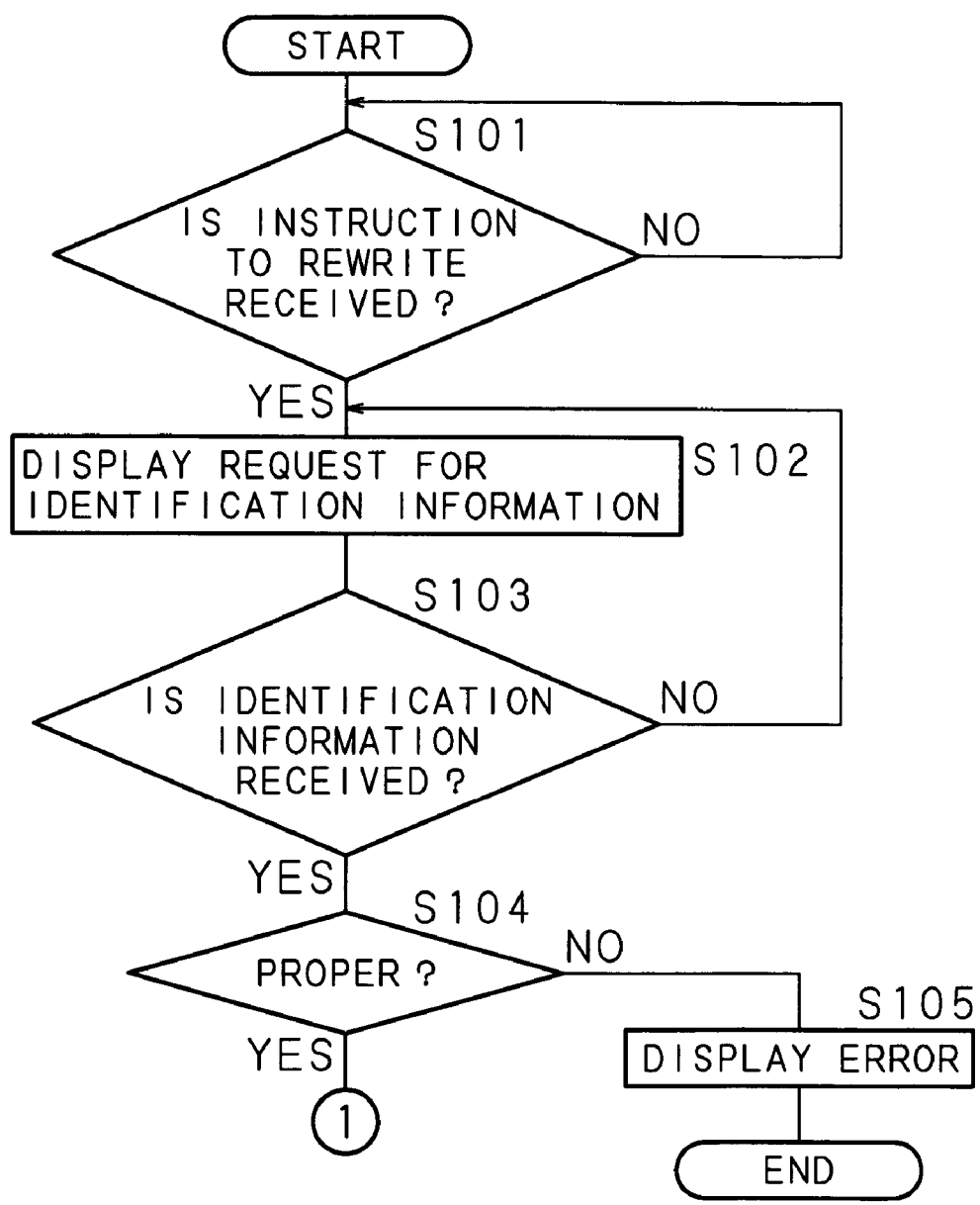
FIGS. 3A, 3B and 3C are a flowchart showing steps involved in a process of rewriting, by an image forming apparatus, the storage contents of the flash memory.
Figure 3B:
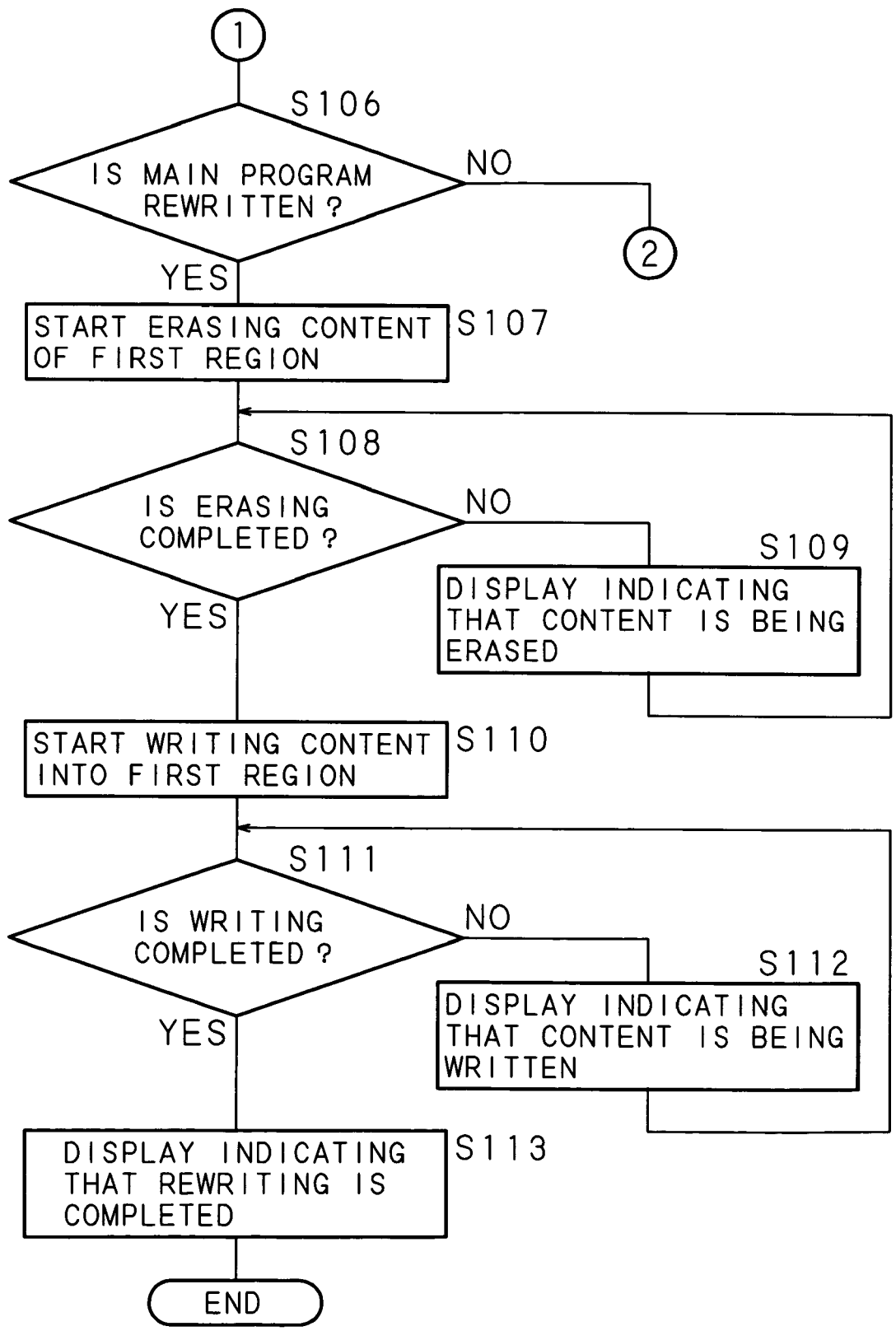
Figure 3C:
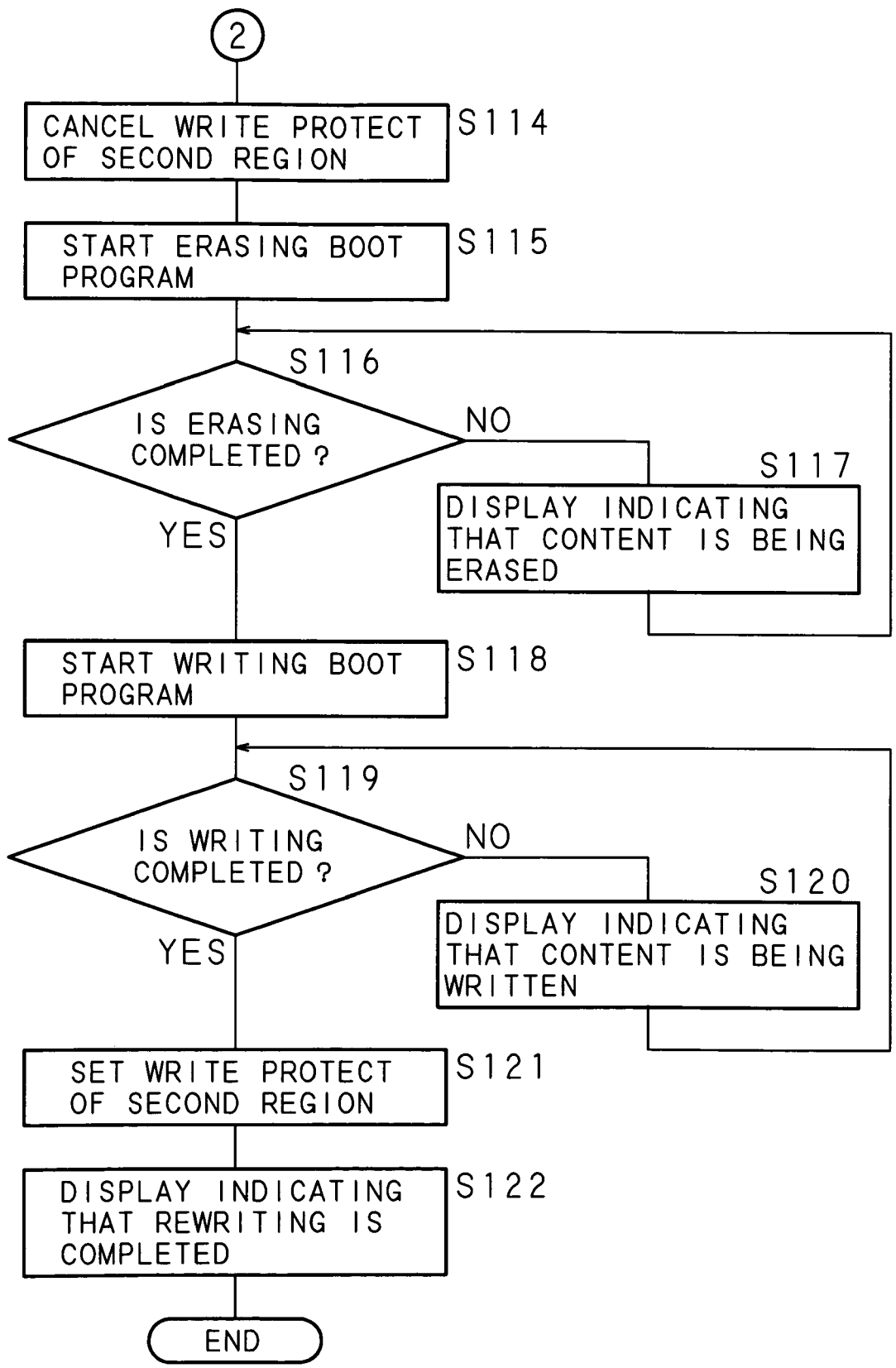

Now, the process performed by the image forming apparatus 1 upon rewriting the flash memory 2 will be explained. FIGS. 3A, 3B and 3C are flowcharts showing the steps involved in a process of rewriting, by the image forming apparatus 1, the storage contents of the flash memory 2. Upon rewriting the flash memory 2, the user inputs a rewrite instruction instructing to rewrite either a main program or a boot program, by operating the input means of the operation portion 15. The CPU 11 monitors the reception of an instruction to rewrite the flash memory 2 from the user with the use of the operation portion 15 (S101). If there is no reception of an instruction to rewrite the flash memory 2 ("NO" at S101), the CPU 11 continues to monitor the reception of an instruction to rewrite the flash memory 2 provided through the operation portion 15.

If, at step S101, the operation portion 15 receives an instruction to rewrite the flash memory 2 ("YES" at S101), the CPU 11 performs the following process according to a rewrite program stored in the second region of the flash memory 2. The CPU 11 allows the display means of the operation portion 15 to display a request for identification information such as a password (S102), and monitors the reception of identification information to be provided by the user operating the input means of the operation portion 15 (S103). If there is no reception of identification information by the operation portion 15 ("NO" at S103), the CPU 11 returns processing to step S102. If the operation portion 15 receives identification information ("YES" at S103), the CPU 11 determines whether the received identification information is predetermined, proper identification information (S104). If the received identification information is not the predetermined, proper identification information ("NO" at S104), the CPU 11 allows the display means of the operation portion 15 to display an error indicating that the flash memory 2 cannot be rewritten (S105), and completes processing. If the received identification information is the predetermined, proper identification information ("YES" at S104), the CPU 11 determines whether the instruction to rewrite the flash memory 2 received at step S101 is an instruction to rewrite the main program (S106).

Figure 4B:
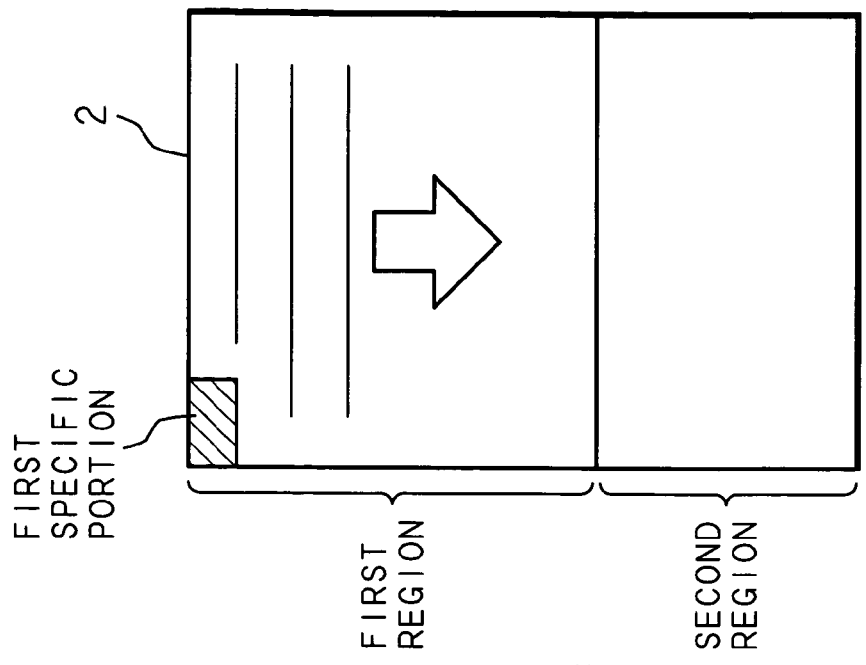
FIG. 4B is a schematic diagram showing a method of writing storage contents into the first region of the flash memory.
Figure 4A:
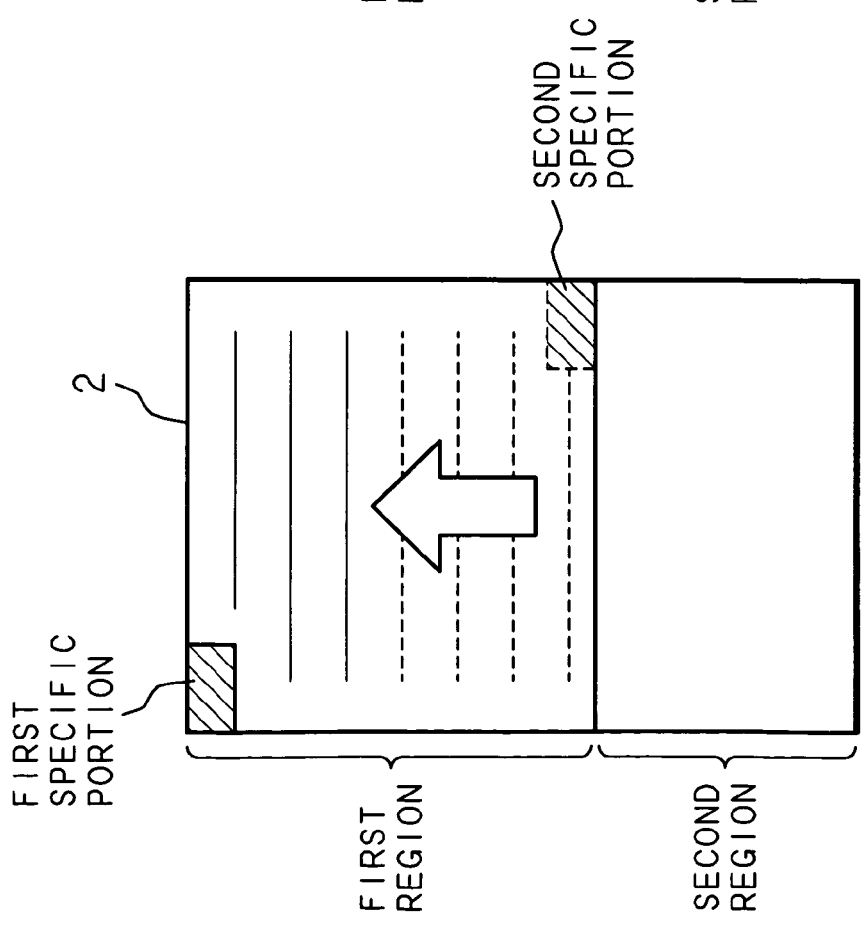
FIG. 4A is a schematic diagram showing a method of erasing storage contents of a first region of the flash memory.

If, at step S106, the instruction to rewrite the flash memory 2 is determined to be an instruction to rewrite the main program ("YES" at S106), the CPU 11 starts erasing the storage contents of the first region of the flash memory 2 (S107). FIGS. 4A and 4B are schematic diagrams showing a method of rewriting the storage contents of the first region of the flash memory 2. FIG. 4A is a diagram showing a method of erasing the storage contents of the first region, and FIG. 4B is a diagram showing a method of writing new storage contents into the first region. As shown in FIG. 4A, the CPU 11 performs a process of sequentially erasing the storage contents from a portion of the first region that contains an ending address toward a portion of the first region that contains a starting address. Thus, information indicating that the storage contents are completely written into the first region, which is stored in a second specific portion, is erased first, and information indicating a starting address of a second region, which is stored in the first specific portion, is erased last. Therefore, if an error occurs, where the image forming apparatus 1 is stopped while erasing is being performed, the second specific portion has no storage content while in the first specific portion the information indicating the starting address of the second region is still stored without being erased.

The CPU 11 then determines whether the erasing of the storage contents of the first region is completed (S108). If the erasing is not completed ("NO" at S108), the CPU 11 allows the display means of the operation portion 15 to display information indicating that the storage contents of the first region are being erased (S109), and returns processing to step S108. If the erasing of the storage contents of the first region is completed ("YES" at S108), the CPU 11 starts writing new storage contents including a new main program, into the first region (S110). At this point, the CPU 11 performs a process of receiving data of new storage contents from an external device or a communication network connected to the interface portion 16, and then writing the received data. Note that the CPU 11 may receives, in advance, data of new storage contents from an external device or a communication network connected to the interface portion 16, and stores the data in other storage means (not shown), and performs a process of writing the pre-stored data at step S110.

Upon writing new storage contents, as shown in FIG. 4B, the CPU 11 performs a process of sequentially writing the new storage contents into the first region from a portion containing a starting address toward a portion containing an ending address. Thus, information indicating a starting address of a second region, which is stored in a first specific portion, is written first, and information indicating that the storage contents are completely written into the first region, which is stored in a second specific portion, is written last. Therefore, even if an error occurs, where the image forming apparatus 1 is stopped while writing is being performed, the second specific portion has no storage content while the first specific portion has stored therein the information indicating the starting address of the second region.

The CPU 11 then determines whether the writing of the new storage contents including a new main program into the first region is completed (S111). If the writing is not completed ("NO" at S111), the CPU 11 allows the display means of the operation portion 15 to display information indicating that new storage contents are being written into the first region (S112), and returns processing to step S111. If the writing of the new storage contents into the first region is completed ("YES" at S111), the CPU 11 allows the display means of the operation portion 15 to display information indicating that the rewriting of the main program of the flash memory 2 is completed (S113), and completes processing.

If, at step S106, the instruction to rewrite the flash memory 2 is an instruction to rewrite the boot program ("NO" at S106), the CPU 11 cancels a write-protect setting that disables rewriting of the storage contents of the second region of the flash memory 2 (S114), and starts erasing the boot program stored in the second region (S115). Subsequently, the CPU 11 determines whether the erasing of the boot program is completed (S116). If the erasing of the boot program is not completed ("NO" at S116), the CPU 11 allows the display means of the operation portion 15 to display information indicating that the boot program is being erased (S117), and returns processing to step S116. If the erasing of the boot program is completed ("YES" at S116), the CPU 11 starts writing a new boot program received from an external device or a communication network connected to the interface portion 16, into a portion of the second region where the boot program should be stored (S118).

The CPU 11 then determines whether the writing of the new boot program is completed (S119). If the writing is not completed ("NO" at S119), the CPU 11 allows the display means of the operation portion 15 to display information indicating that the boot program is being written (S120), and returns processing to step S119. If the writing of the new boot program is completed ("YES" at S119), the CPU 11 sets a write protect that disables rewriting of the storage contents of the second region of the flash memory 2 (S121). Subsequently, the CPU 11 allows the display means of the operation portion 15 to display information indicating that the rewriting of the boot program is completed (S122), and completes processing.

Note that although in the aforementioned process the main and boot programs are individually rewritten, the main and boot programs may be rewritten at the same time where necessary.

Figure 5:
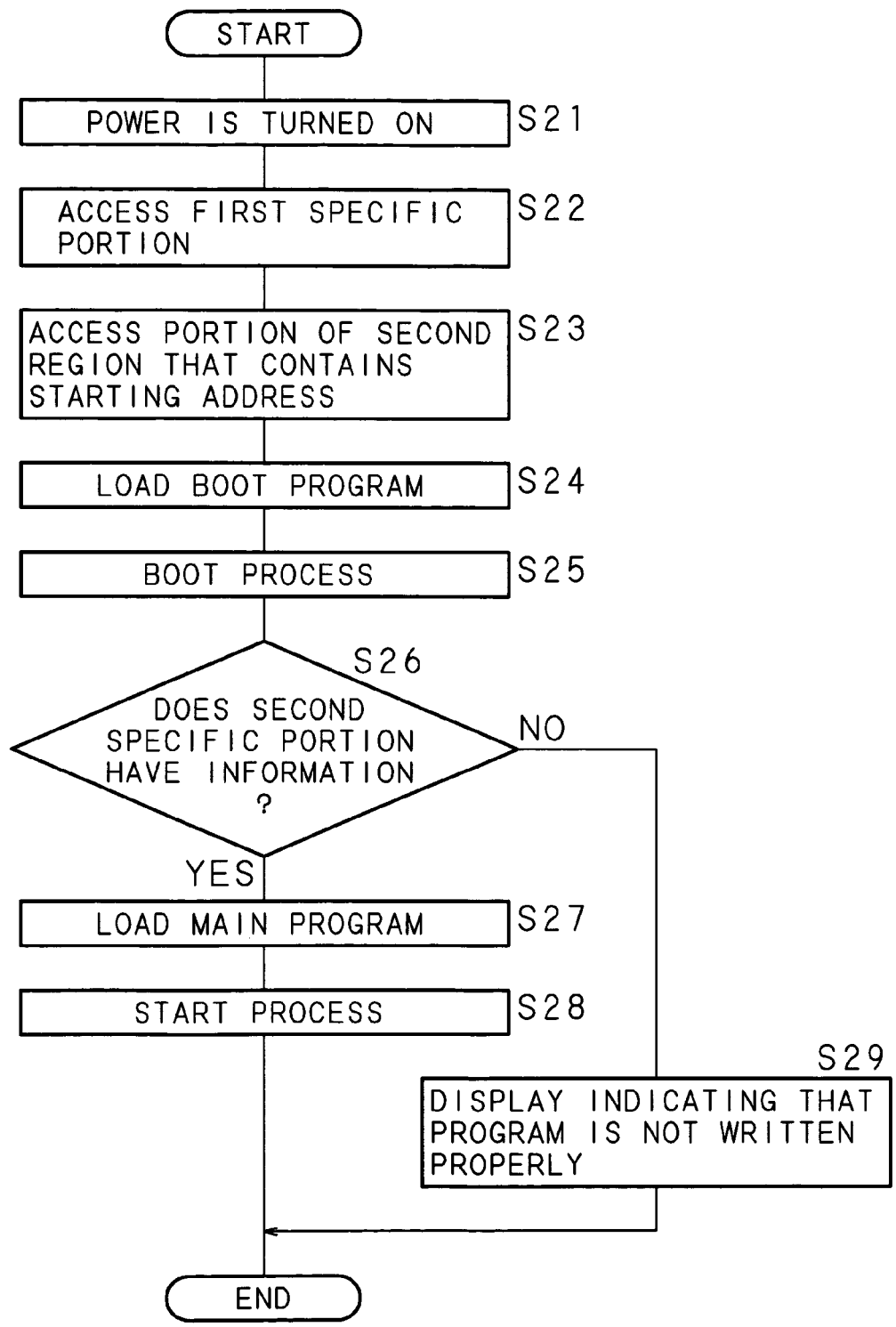
FIG. 5 is a flowchart showing steps involved in booting by the image forming apparatus.

Now, the process performed by the image forming apparatus 1 when the image forming apparatus 1 boots up will be explained. FIG. 5 is a flowchart showing the steps involved in booting by the image forming apparatus 1. When the power to the image forming apparatus 1 is turned on (S21), the CPU 11 first accesses a first specific portion including a portion containing a starting address of the flash memory 2 (S22). The first specific portion has stored therein information indicating a starting address of a second region. The CPU 11 then accesses a portion of the second region that contains the starting address, which is indicated by the information stored in the first specific portion (S23). Subsequently, the CPU 11 loads a boot program stored in the accessed second region into the RAM 12 (S24), and performs a boot process on the image forming apparatus 1 according to the loaded boot program (S25).

The CPU 11 then determines, according to the boot program loaded into the RAM 12, whether a second specific portion including a portion containing an ending address of the first region of the flash memory 2 has stored therein information indicating that the storage contents are completely written into the first region (S26). If the second specific portion has stored therein the information indicating that the storage contents are completely written into the first region ("YES" at S26), the CPU 11 loads a main program stored in the first region of the flash memory 2 into the RAM 12 (S27). The CPU 11 then starts a process which represents the function of the image forming apparatus 1, according to the main program loaded into the RAM 12 (S28), and completes the boot process.

If the second specific portion has no storage content and does not have stored therein information indicating that the storage contents are completely written into the first region, there is a possibility that the image forming apparatus 1 may be stopped while the storage contents of the first region are being erased or written, and as a result, the program stored in the first region may be incomplete. If the second specific portion has no storage content at step S26 ("NO" at S26), the CPU 11 allows the display means of the operation portion 15 to display information indicating that the main program is not properly written into the flash memory 2 (S29), and completes the boot process without proceeding processing any further. The user resolves an error where the image forming apparatus 1 does not operate properly, by performing an operation such as another rewrite process of the flash memory 2.

The image forming apparatus 1 performs the above-described boot process not only when the power is turned on but also when a reset is performed. The image forming apparatus 1 may perform a process of automatically starting rewriting the flash memory 2 after step S29.

As described in detail above, in the present invention, upon rewriting a main program stored in a first region of the flash memory 2, the storage contents of the first region are erased such that a storage content of a first specific portion which is accessed first upon boot-up by the CPU 11 is erased last, and new storage contents are written into the first region such that a storage content of the first specific portion is written first. Therefore, even after an error occurs, where the image forming apparatus 1 is stopped while the storage contents of the first region of the flash memory 2 are being erased or new storage contents are being written into the first region of the flash memory 2, the storage content of the first specific portion still remains. Accordingly, upon boot-up, the CPU 11 is able to access the flash memory 2 properly. Since the first specific portion has stored therein information necessary to access a portion of a second region of the flash memory 2 where a boot program is stored, by the CPU 11 executing the boot program according to the information stored in the first specific portion, even if rewriting of the flash memory 2 is failed, the image forming apparatus 1 can always start up.

In the present invention, the flash memory 2 has, within the first region, a second specific portion whose storage content is erased first and written last when the main program stored in the first region of the flash memory 2 is rewritten, and the second specific portion has stored therein information indicating whether the storage contents are completely written into the first region. If an error occurs, where the image forming apparatus 1 is stopped while the storage contents of the first region of the flash memory 2 are being erased or new storage contents are being written into the first region of the flash memory 2, since the second specific portion has no information stored therein, by checking the storage content of the second specific portion, whether the rewriting of the main program is done properly can be easily determined.

In the present invention, since information indicating whether the storage contents are completely written into the first region is checked during a boot process, whether the rewriting of the main program is done properly can be determined, and an operation appropriate for the status of the main program can be performed. Particularly, by checking, before starting the main program, information indicating whether the storage content are completely written into the first region, which is stored in the second specific portion, even if there is an error in the main program, without the electronic device being abnormally stopped, an operation appropriate for the status of the main program, such as re-rewriting of the main program, can be performed.

In the present invention, not only a main program but also a boot program can be rewritten, and thus updating of the boot program is facilitated. Furthermore, in the present invention, an input of predetermined identification information is required before a main program is rewritten, which in turn prevents unauthorized rewriting by users having no authority to rewrite the main program.

Note that although the present embodiment shows an example in which the first specific portion of the flash memory 2 which is accessed first upon boot-up by the CPU 11 is a portion containing the starting address of the first region, and the second specific portion is a portion including a portion containing the ending address of the first region, the present invention is not limited thereto. As long as the first specific portion of the flash memory 2 is accessed first upon boot-up by the CPU 11, and has a storage content which is erased last and written first upon rewriting the first region, the first specific portion may be any portion; for example, the first specific portion may be a portion including a portion of an address other than the starting address of the first region. Similarly, as long as the second specific portion has a storage content which is erased first and written last upon rewriting the first region, the second specific portion may be any portion; for example, the second specific portion may be a portion including a portion of an address other than the ending address of the first region.

Although in the present embodiment the electronic device of the present invention is described in the form of an image forming apparatus, the present invention is not limited thereto. The electronic device of the present invention may be any other form, such as a PC or a household electrical appliance. In addition, although in the present embodiment the rewritable, nonvolatile memory of the present invention is described in the form of a flash memory, the rewritable, nonvolatile memory may be any other form as long as the memory is a rewritable, nonvolatile memory.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A rewritable, nonvolatile memory comprising:
a first region that stores a processing program which allows an electronic device to perform a process;
a second region that stores a boot program and a rewrite program, the boot program allowing the electronic device to perform a boot and the rewrite program allowing the electronic device to rewrite the processing program; and
a first specific portion provided in the first region and having stored therein information necessary for the electronic device to access a portion of the second region where the boot program is stored, the first specific portion being accessed first upon boot-up by the electronic device, wherein
the rewrite program comprises the steps of:
allowing the electronic device to erase storage contents of the first region such that a storage content of the first specific portion is erased last; and
after the storage contents of the first region are erased by the erasing step, allowing the electronic device to write storage contents including a new processing program into the first region such that a storage content of the first specific portion is written first.

2. The rewritable, nonvolatile memory according to claim 1, further comprising:
a second specific portion which is provided in the first region and whose storage content is erased first upon erasing the storage contents of the first region and is written last upon writing the storage contents including a new processing program into the first region, the erasing and the writing being performed by the electronic device according to the rewrite program, wherein
the second specific portion has stored therein information indicating whether the storage contents are completely written into the first region.

3. The rewritable, nonvolatile memory according to claim 2, wherein the boot program comprises the steps of:
allowing the electronic device to check a content of the information indicating whether the storage contents are completely written into the first region, the information being stored in the second specific portion; and
allowing the electronic device to determine a subsequent process to be performed, according to the checked content of the information.

4. The rewritable, nonvolatile memory according to claim 2, wherein
the boot program comprises the steps of:
allowing the electronic device to start the processing program stored in the first region;
allowing the electronic device to check, prior to the start of the processing program, content of the information indicating whether the storage contents are completely written into the first region, the information being stored in the second specific portion; and
allowing the electronic device to determine a subsequent process to be performed, according to the checked content of the information.

5. The rewritable, nonvolatile memory according to claim 1, wherein the rewrite program further comprises the step of allowing the electronic device to rewrite the boot program stored in the second region.

6. The rewritable, nonvolatile memory according to claim 1, wherein the rewrite program further comprises the steps of:
allowing the electronic device to request, prior to the rewriting of the program, for reception of predetermined identification information; and
allowing, if the predetermined identification information is received, the electronic device to start rewriting the program.

7. A rewritable, nonvolatile memory comprising:
a first region that stores a processing program which allows an electronic device to perform a process;
a second region that stores a boot program and a rewrite program, the boot program allowing the electronic device to perform a boot and the rewrite program allowing the electronic device to rewrite the processing program; and
a first specific portion provided in a portion of the first region which includes a portion containing a starting address, the first specific portion having stored therein information necessary for the electronic device to access a portion of the second region where the boot program is stored, the first specific portion being accessed first upon boot-up by the electronic device, wherein
the rewrite program comprises the steps of:
allowing the electronic device to sequentially erase storage contents of the first region from a portion of the first region that contains an ending address toward the portion containing the starting address; and
after the storage contents of the first region are erased by the erasing step, allowing the electronic device to sequentially write storage contents including a new processing program into the first region from the portion containing the starting address toward the portion containing the ending address.

8. The rewritable, nonvolatile memory according to claim 7, further comprising:
a second specific portion provided in a portion of the first region which includes a portion containing the ending address, and having stored therein information indicating whether the storage contents are completely written into the first region.

9. The rewritable, nonvolatile memory according to claim 8, wherein the boot program comprises the steps of:
  allowing the electronic device to check a content of the information indicating whether the storage contents are completely written into the first region, the information being stored in the second specific portion; and
  allowing the electronic device to determine a subsequent process to be performed, according to the checked content of the information.

10. The rewritable, nonvolatile memory according to claim 8, wherein the boot program comprises the steps of:
  allowing the electronic device to start the processing program stored in the first region;
  allowing the electronic device to check, prior to the start of the processing program, content of the information indicating whether the storage contents are completely written into the first region, the information being stored in the second specific portion; and
  allowing the electronic device to determine a subsequent process to be performed, according to the checked content of the information.

11. The rewritable, nonvolatile memory according to claim 7, wherein the rewrite program further comprises the step of:
  allowing the electronic device to rewrite the boot program stored in the second region.

12. The rewritable, nonvolatile memory according to claim 7, wherein the rewrite program further comprises the steps of:
  allowing the electronic device to request, prior to the rewriting of the program, for reception of predetermined identification information; and
  allowing, if the predetermined identification information is received, the electronic device to start rewriting the program.

13. An electronic device comprising:
  the rewritable, nonvolatile memory of claim 1; and
  a processor that performs a process according to a program stored in the rewritable, nonvolatile memory.

14. An electronic device comprising:
  the rewritable, nonvolatile memory of claim 7; and
  a processor that performs a process according to a program stored in the rewritable, nonvolatile memory.

15. A method of rewriting a rewritable, nonvolatile memory having a first region that stores a processing program which allows an electronic device to perform a process; a second region that stores a boot program which allows the electronic device to perform a boot; and a specific portion provided in the first region and having stored therein information necessary for the electronic device to access a portion of the second region where the boot program is stored, the specific portion being accessed first upon boot-up by the electronic device, the method comprising:
  erasing storage contents of the first region such that a storage content of the specific portion is erased last; and
  after the storage contents of the first region are erased, writing storage contents including a new processing program into the first region such that a storage content of the specific portion is written first.

16. A method of rewriting a rewritable, nonvolatile memory having a first region that stores a processing program which allows an electronic device to perform a process; a second region that stores a boot program which allows the electronic device to perform a boot; and a specific portion provided in a portion of the first region which includes a portion containing a starting address, the specific portion having stored therein information necessary for the electronic device to access a portion of the second region where the boot program is stored, the specific portion being accessed first upon boot-up by the electronic device, the method comprising:
  sequentially erasing storage contents of the first region from a portion of the first region that contains an ending address toward the portion containing the starting address; and
  after the storage contents of the first region are erased, sequentially writing storage contents including a new processing program into the first region from the portion containing the starting address toward the portion containing the ending address.

17. A computer readable medium having stored thereon a rewrite program which allows an electronic device to rewrite a processing program stored in a nonvolatile memory, the nonvolatile memory having a first region that stores the processing program which allows the electronic device to perform a process; a second region that stores a boot program which allows the electronic device to perform a boot; and a specific portion provided in the first region and having stored therein information necessary for the electronic device to access a portion of the second region where the boot program is stored, the specific portion being accessed first upon boot-up by the electronic device, the rewrite program comprising the steps of:
  allowing the electronic device to erase storage contents of the first region such that a storage content of the specific portion is erased last; and
  after the storage contents of the first region are erased by the erasing step, allowing the electronic device to write storage contents including a new processing program into the first region such that a storage content of the specific portion is written first.

18. A computer readable medium having stored thereon a rewrite program which allows an electronic device to rewrite a processing program stored in a nonvolatile memory, the nonvolatile memory having a first region that stores the processing program which allows the electronic device to perform a process; a second region that stores a boot program which allows the electronic device to perform a boot; and a specific portion provided in a portion of the first region which includes a portion containing a starting address, the specific portion having stored therein information necessary for the electronic device to access a portion of the second region where the boot program is stored, the specific portion being accessed first upon boot-up by the electronic device, the rewrite program comprising the steps of:
  allowing the electronic device to sequentially erase storage contents of the first region from a portion of the first region that contains an ending address toward the portion containing the starting address; and
  after the storage contents of the first region are erased by the erasing step, allowing the electronic device to sequentially write storage contents including a new processing program into the first region from the portion containing the starting address toward the portion containing the ending address.

* * * * *